United States Patent
Welther

[15] 3,652,042
[45] Mar. 28, 1972

[54] SPACECRAFT FOR DEPLOYING MULTIPLE OBJECTS

[72] Inventor: Robert S. Welther, Los Angeles, Calif.
[73] Assignee: TRW Inc., Redondo Beach, Calif.
[22] Filed: Dec. 28, 1970
[21] Appl. No.: 101,521

[52] U.S. Cl. .........................................................244/1 SS
[51] Int. Cl. ......................................................B64g 1/10
[58] Field of Search ....................244/1 SS, 1 SB, 1 SD, 1 SA, 244/77 SS; 102/49.4

[56] References Cited

UNITED STATES PATENTS

| 3,380,687 | 4/1968 | Wrench et al. | 244/1 SS |
| 3,547,375 | 12/1970 | Mackey | 244/1 SS |

*Primary Examiner*—Joseph Wegbreit
*Assistant Examiner*—Bruce H. Stoner, Jr.
*Attorney*—Daniel T. Anderson, Donald R. Nyhagen and Jerry A. Dinardo

[57] ABSTRACT

A spacecraft for inserting multiple objects into selected space flight paths in selected attitudes relative to the flight paths by deploying the objects, either passively or actively, from extendable object mounting platforms gimballed on one end of the vehicle body. During launch the platforms are retracted to fit within the launch vehicle shroud. After separation of the spacecraft from the booster in space, the platforms are extended to object deployment positions and the spacecraft is oriented by thrusters in a flight attitude wherein the thrust vector of a main propulsion engine on the vehicle body is aligned with the local range insensitive axis. Object deployment is accomplished by utilizing the main engine to propel the spacecraft along the range insensitive axis across the selected flight paths and by tilting the mounting platforms at each deployment point to orient the object to be deployed in the proper deployment attitude relative to the selected flight path.

13 Claims, 8 Drawing Figures

Robert S. Welther
INVENTOR.

BY
ATTORNEY

Robert S. Welther
INVENTOR.

BY
ATTORNEY

Robert S. Welther
INVENTOR

Robert S. Welter
*INVENTOR.*
BY
ATTORNEY

Robert S. Welther
INVENTOR.

Robert S. Welther
*INVENTOR.*

BY
*Donald R. ...*
ATTORNEY

SPACECRAFT FOR DEPLOYING MULTIPLE OBJECTS

BACKGROUND OF THE INVENTION

1. Field of the Invention

This invention relates generally to the space field and more particularly to a spacecraft for inserting multiple objects into selected space flight paths in selected attitudes relative to the paths.

2. Prior Art

Spacecraft of the class to which this invention pertains are launched into space carrying a number of objects which are deployed at intervals from the spacecraft in a manner such that each object is inserted into a selected space flight path. While the flight paths into which the objects are inserted may be either orbital paths, outer space paths, or ballistic trajectories, the invention will be disclosed in connection with object deployment into ballistic trajectories.

When deploying objects into ballistic trajectories, the spacecraft is launched into an initial ballistic trajectory. Any of the objects which are to follow this initial trajectory are then deployed from the spacecraft. Insertion of objects into other ballistic trajectories is accomplished by propelling the spacecraft along various local range insensitive axes across the desired trajectories and deploying the objects along the different trajectories. Such deployment may be accomplished either passively or actively. Passive deployment of an object is accomplished by releasing the object for separation from the spacecraft and backing the spacecraft away from the object. Active deployment involves forcible ejection of the object from the spacecraft by spring action or the like.

Actual separation of the deployable objects from the spacecraft along the selected trajectories is only one of the requirements for proper insertion of the objects into these trajectories. Another requirement involves proper orientation of each object relative to its trajectory at the time of separation from the spacecraft. Thus, objects which are deployed in the manner described herein generally have an axis, referred to as a reference axis, which must be oriented at a predetermined angle relative to the respective trajectories at the time of deployment.

The existing spacecraft for deploying objects in the manner explained are characterized by certain inherent disadvantages with which the present invention is concerned.

DESCRIPTION OF THE PREFERRED EMBODIMENTS

Figure 1:
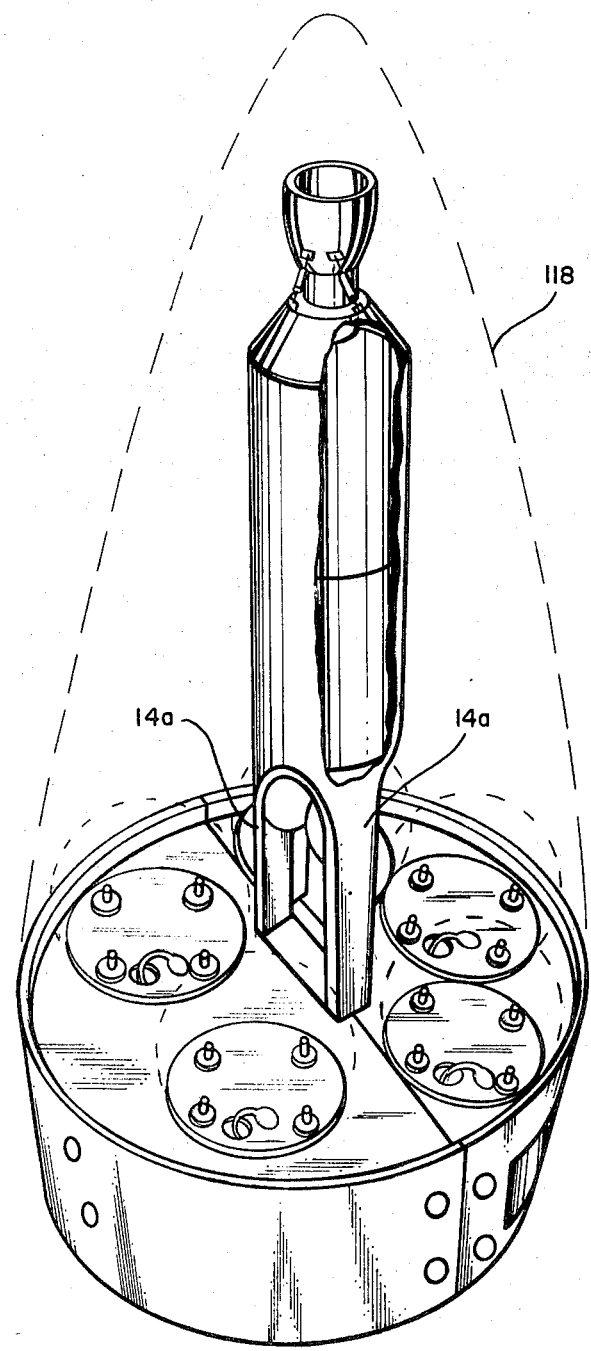
FIG. 1 is a perspective view of the present spacecraft with its deployment platforms retracted.
Figure 2:
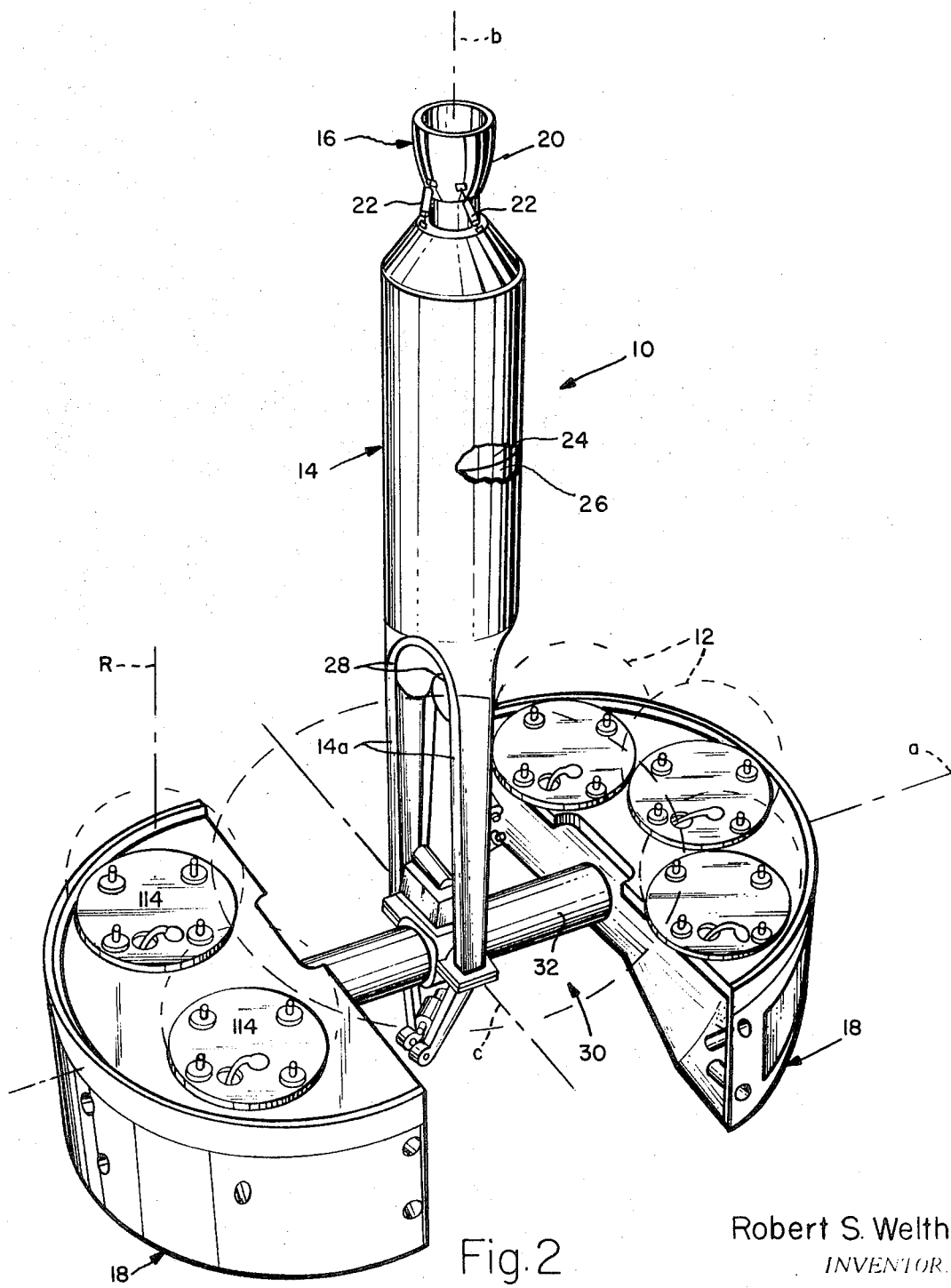
FIG. 2 is a view similar to FIG. 1 with the platforms extended.
Figure 3:
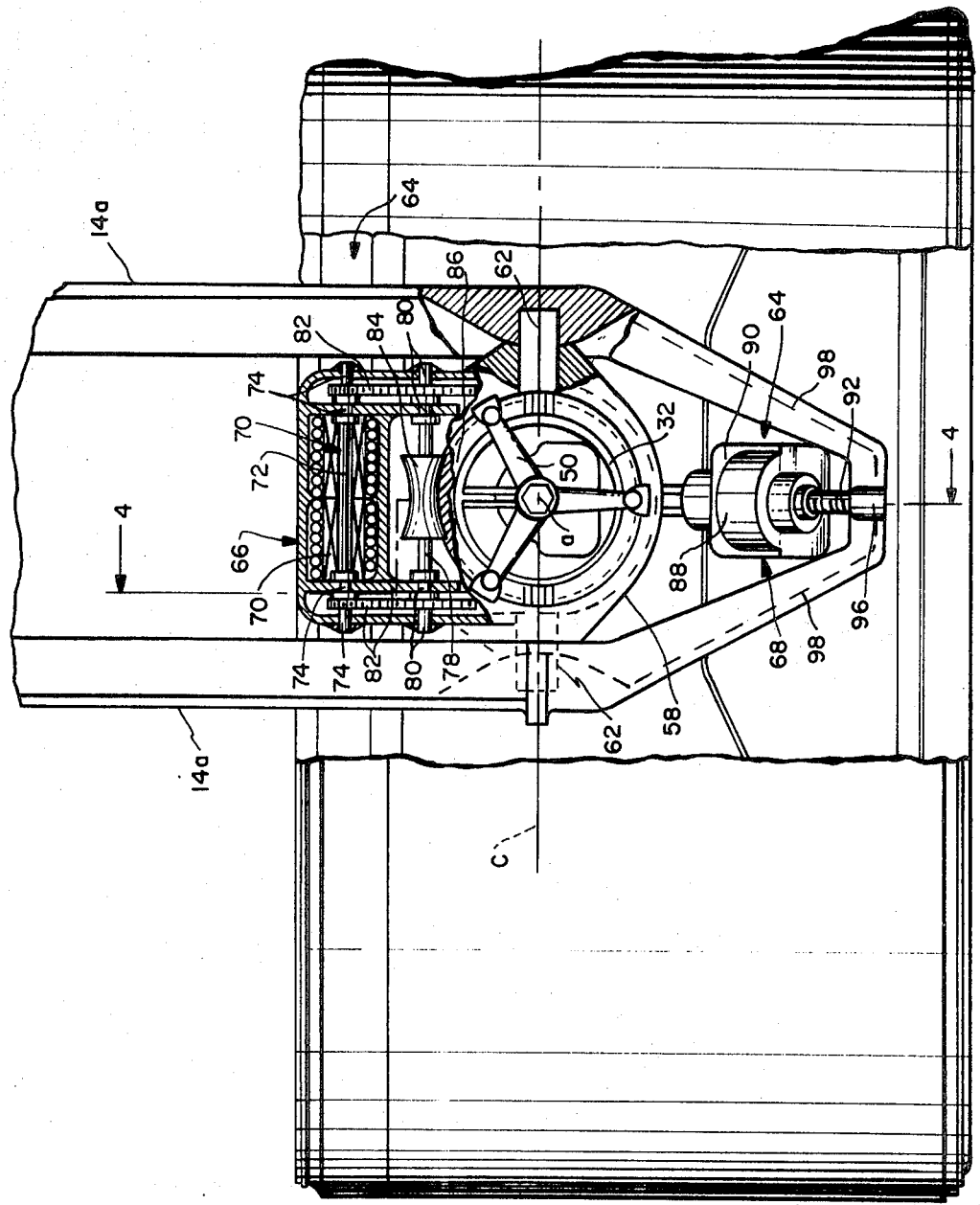
FIG. 3 is a side elevation of the spacecraft with parts broken away and sectioned.
Figure 4:
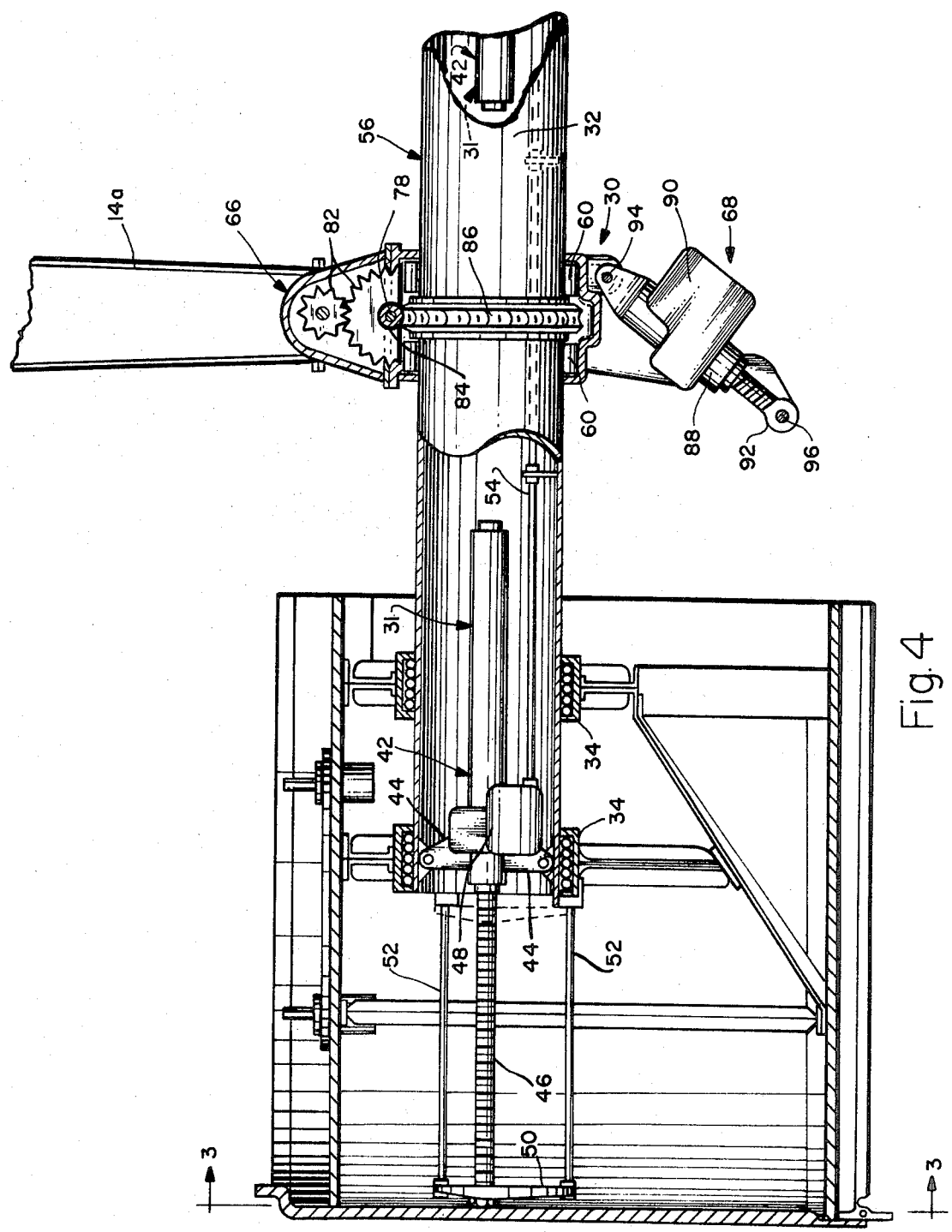
FIG. 4 is a section taken on line 4—4 in FIG. 3.
Figure 5:
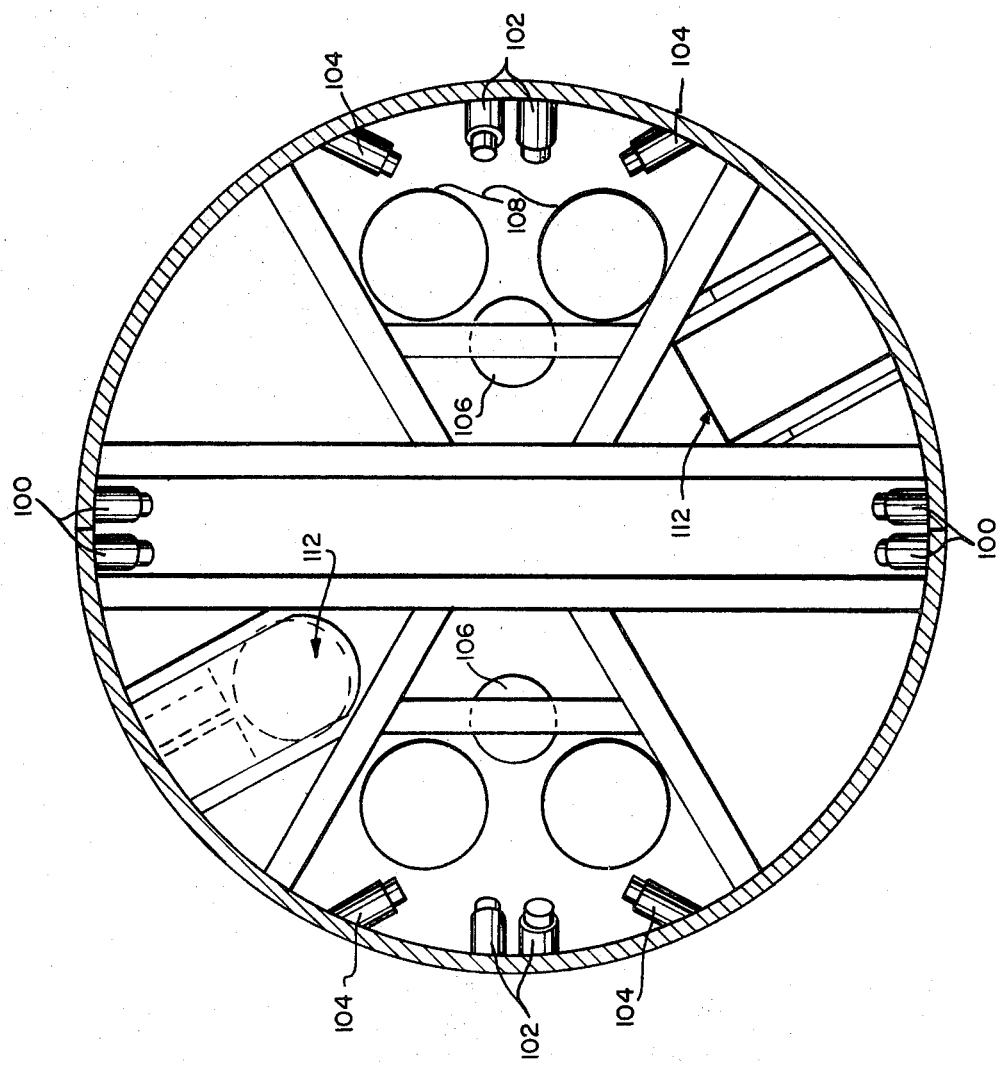
FIG. 5 is a section through the deployment platforms with certain parts omitted for clarity.

The drawings illustrate a spacecraft 10 according to the invention for launching multiple objects 12 into selected space flight paths in selected attitudes relative to the paths. Spacecraft 10 has an elongate, generally tubular body 14 mounting a main propulsion engine 16 at one end and a pair of object mounting platforms 18 at the other end. Engine 16 has a gimballed thrust chamber 20. A number of gimbal actuators 22 are connected between this chamber and the spacecraft body. According to a feature of the invention to be explained in greater detail presently, the actuators 22 are controlled to continuously orient the thrust chamber in an attitude such that the engine thrust vector passes through the center of gravity of the spacecraft. Contained with the spacecraft body 14 are fuel, oxidizer, and pressurizing tanks 24, 26, and 28 for the engine 16. Alternatively a solid propellant or hybrid type propulsion system with start/stop capability may be substituted for the liquid propellant system shown.

Object mounting platforms 18 are generally semicircular in shape and are located at diametrically opposite sides of the spacecraft body 14. Extending between the platforms are drive means 30 for moving the platforms relative to one another and to the body along an extension axis $a$ intersecting the longitudinal axis $b$ of the body and passing through the centers of and bisecting the platforms. The platforms are movable by the drive means between retracted and extended positions relative to the spacecraft body 14. In retracted positions, the platforms are disposed inwardly adjacent and in concentric relation to the body with the straight diametrical sides of the platforms in contact. In extended positions, the platforms are disposed laterally outboard of the body. As will be explained in more detail presently, the platforms are retracted during launch and are extended after separation of the spacecraft from its booster in space.

The particular platform drive means 30 illustrated comprises a pair of ball screw actuators 31 contained within a cylindrical barrel 32 which extends along the platform extension axis $a$ and between a pair of spaced longitudinal support arms 14a on the spacecraft body 14. The ends of barrel 32 extend through bearings 34 on the platforms 18. Barrel 32 and bearings 34 support the platforms 18 for movement along their extension axis $a$ between their retracted and extended positions. The platforms are keyed against rotation relative to the actuator barrel 32.

The ball screw actuators 31 have drive units 42 generally concentrically disposed within the ends of the actuators barrel 32 and attached to the barrel by brackets 44. The actuator screws 46 extend through the open ends of the actuator barrel. Embodied in the actuator drive units 42 are motors 48 which drive ball nuts (not shown) on the ball screws 46 to drive the latter axially relative to the actuator barrel. Attached to the outer ends of the ball screws are spiders 50. Tie rods 52 fixed to the outer ends of the spider attach to the outer races of the platform bearings 34.

Ball screw actuators 31 drive the object mounting platforms 18 along the platform extension axis $a$ between the retracted and extended positions of the platforms. The actuator motor circuits include limit switches for cutting off the motors in these positions. As noted earlier and hereafter explained in more detail, the platforms are retained in their retracted positions during launch and are extended after separation of the spacecraft 10 from its booster in space. The actuator drive motors 48 are interconnected by a drive shaft 54 which serves two functions. First, the drive shaft effectively synchronizes the motors to assure extension of the platforms 18 in unison so as to maintain the center of gravity of the spacecraft on the longitudinal body axis $b$ and balance the lateral action and retraction forces on the spacecraft. Secondly, the drive shaft provides redundancy in the platform drive system. Thus, if either motor fails, the platforms may be extended by the remaining motor. In this regard, it will be understood that the motors are selected to have sufficient power for 58 surrounding the center of the barrel 32 and containing bearings 60 which rotatably platforms by either motor alone.

The center of the actuator barrel 32 is mounted by gimbal means 56 on the arms 14a of the spacecraft body 14. Gimbal means 56 support the barrel, and hence the object mounting platforms 14, for rotation relative to the body on the platform extension axis $a$ and a transverse axis $c$ intersecting the axis $a$ and $b$ at right angles. The illustrated gimbal means comprises a housing 60 which rotatably support the barrel for turning on the extension axis $a$. Pivots 62 support the housing 58 on the spacecraft body arms 14a for turning on the transverse axis $c$.

Associated with the gimbal means 56 are positioning means 64 for angularly positioning the actuator barrel 32 and hence the platforms 14 on the gimbal axes $a$, $c$. Positioning means 64 comprises a pair of positioning devices 66, 68 for driving the barrel and platforms about the gimbal axes $a$, $c$, respectively. Positioning device 66 embodies a pair of motors 70 arranged side by side within the gimbal housing 58 along a common shaft 72. Shaft 72 parallels the gimbal axis $c$ and is rotatably supported by bearings 74 mounted within the walls of the gimbal housing. The rotors of motors 70 are fixed to the shaft 72, whereby the latter is driven by the motors. Between the actuator barrel 32 and the shaft 72 is a second shaft 78. Shaft 78 parallels the shaft 72 and is rotatably supported by bearings 80 in the gimbal housing walls. Shafts 72, 78 are drivably coupled at their ends by reduction gear trains 82. A worm gear 84 fixed on the center of shaft 78 meshes with a worm wheel 86 surrounding and fixed to the actuator barrel 32. The barrel and hence the object mounting platforms 18 are thus rotatably positionable about the platform extension axis $a$ by the motors 70. These motors provide a redundant drive for the actuator barrel in that each motor is capable of driving the barrel in the event that the other motor fails.

Positioning device 68 is a ball screw actuator having an actuator drive unit 88 including a motor 90 and a ball screw 92 driven axially by the motor through a ball nut (not shown) within the drive unit. Drive unit 88 is pivotally attached at 94 to the gimbal housing 58. The outer end of the actuator screw 92 is pivotally attached at 96 to the apex of a generally V-shaped bracket or yoke 98 fixed to the ends of and extending at an oblique angle from the ends of the spacecraft body arms 14a. The ball screw actuator 68 is thus operable to rotatably position the actuator barrel 32 and platforms 14 about the transverse gimbal axis $c$.

Mounted about the outer arcuate sides of the platforms 18 are pitch thrusters 100, yaw thrusters 102, and roll thrusters 104. As may be readily observed in the drawings, the pitch and yaw thrusters 100, 102 include thrusters whose thrust axes are inclined in both axial directions of the platforms. The roll thrusters 104 include thrusters whose thrust axes are inclined in both circumferential directions of the platforms. Mounted within the platforms are fuel and pressurizing tanks 106, 108 for the thrusters and a control system 112 for the spacecraft.

As noted earlier, the present spacecraft 10 is designed to launch multiple objects 12 into selected flight paths. The particular objects shown are spheres each having a reference axis R. Objects 12 are releasably secured to the platforms 18 by electrically operated deployment actuators 114, such as ball locks. For convenience, objects 12 are shown to be simple spheres.

As will be explained presently, the control system is a programmable control system for controlling the main engine 16 and its gimbal actuators 22, the platform drive means 30 and positioning means 64, thrusters 100, 102, 104 and object deployment actuators 114. Prior to launch, this control system is programmed to accomplish one of the deployment sequences described below.

Figure 7:
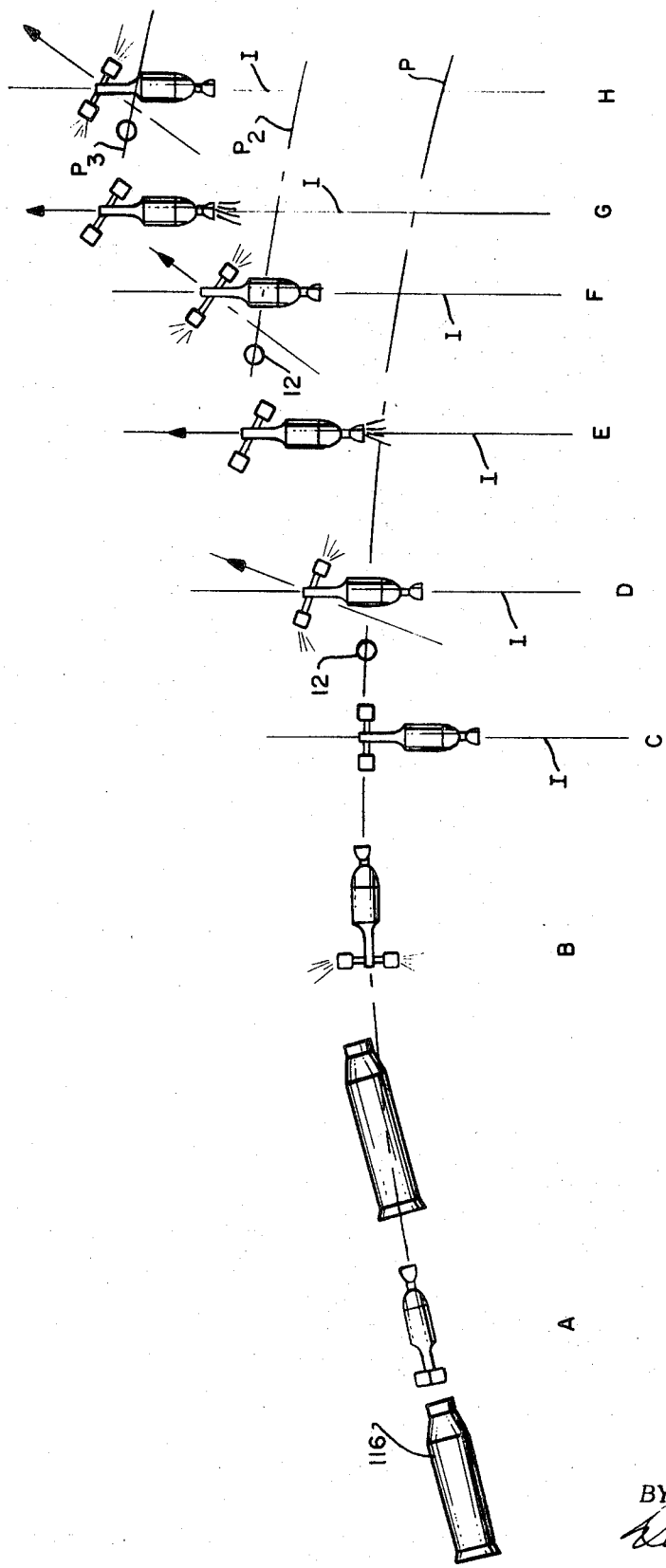
FIGS. 7 and 8 illustrate two object deployment sequences.
Figure 8:
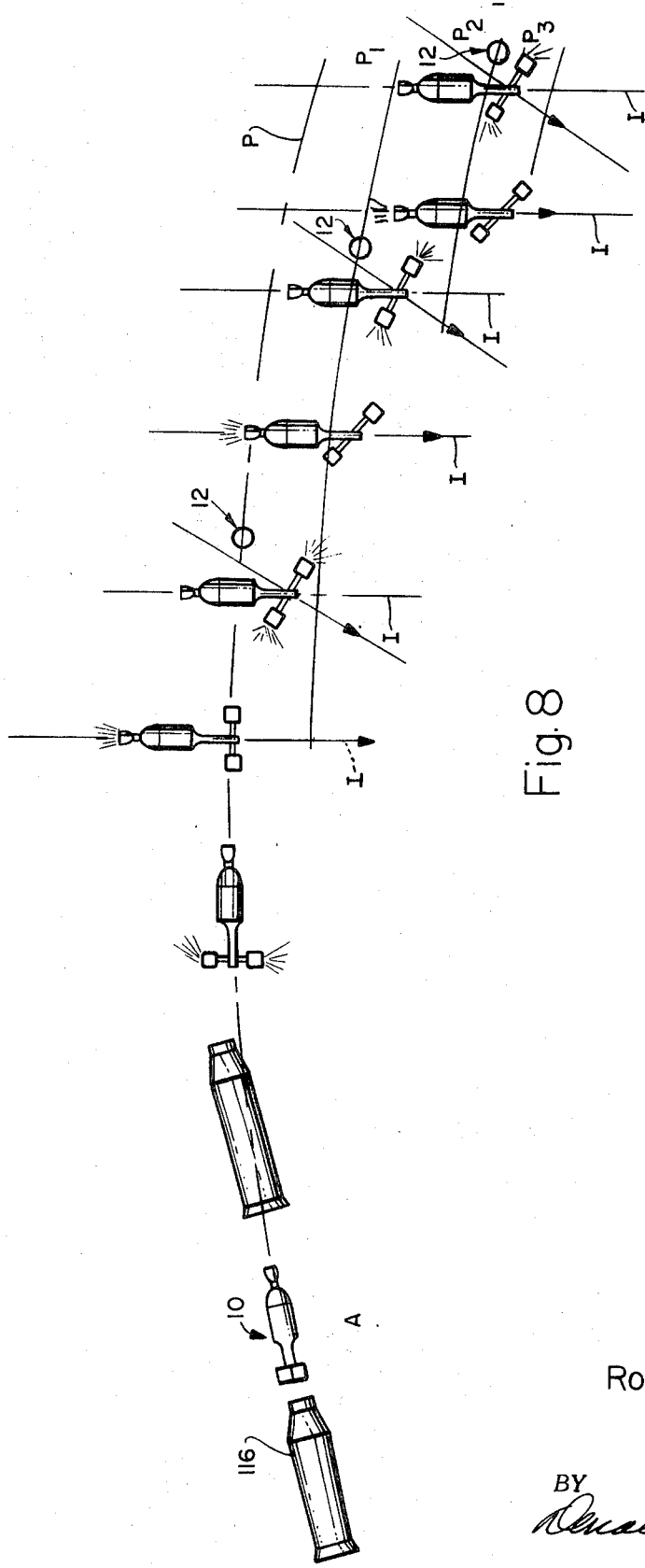

FIG. 7 illustrates a deployment sequence for inserting the objects 12 into successive flight paths of increasing altitude. FIG. 8 illustrates a deployment sequence for inserting the objects into successive flight paths of decreasing altitude.

In the deployment sequence of FIG. 7, the spacecraft 10 is launched into an initial flight path P, by means of a launch vehicle 116. During this launch phase the spacecraft 10 is contained within the nose shroud 118 of the launch vehicle with the platforms 18 of the spacecraft retracted to their positions of FIG. 1. After separation of the spacecraft from the launch vehicle booster in space (A FIG. 7), the spacecraft thrusters 100, 102, 104 are fired to initially stabilize the spacecraft at the correct velocity on the initial flight path (B FIG. 7) and then rotate the spacecraft to align the thrust axis of its main engine 16 down the local range insensitive axis I (C FIG. 7). This range insensitive axis is an axis passing through spacecraft and the center of the earth. The spacecraft platforms 18 are also extended. Accordingly, the spacecraft moves laterally along the flight path. The attitude of the spacecraft is continuously adjusted as it travels along the flight path to maintain its thrust axis aligned with the local range insensitive axes.

Assuming an object 12 is to be injected, by passive deployment into the initial flight path, the platform positioning means 64 are operated to rotate the platforms 18 on their axes $a$, $c$ to positions wherein the reference axis R of the object is oriented at the proper deployment attitude relative to the path, the deployment actuator 114 for the object is released, and the pitch and yaw thrusters 100, 102 are fired to propel the spacecraft 10 away from the released object along a direction line normal to the spacecraft platforms 18 (D FIG. 7). This action separates the object from its platform for free flight along the initial flight path P.

After the spacecraft 10 has coasted a sufficient distance from the deployed object 12 so as not to disturb its flight, the main engine 16 is then fired to accelerate the spacecraft 10 outwardly or upwardly along the local range insensitive axis I to the next flight path $P_2$ into which an object 12 is to be injected (E FIG. 7). While coasting to flight path $P_2$, the platforms 18 are adjusted to orient them at the proper deployment attitude relative to the reference axis R of the next object to be released. After release of the deployment actuator 114 for the object, the thrusters 100, 102 are fired to propel the spacecraft away from the object along a direction line normal to the platforms and thereby deploy the object into the flight path $P_2$ (F FIG. 7). The spacecraft engine 16 is then again fired to propel the craft outwardly along the local range insensitive axis to the next flight path $P_3$ into which an object is to be deployed. This procedure is repeated for each object and flight path.

As noted earlier, FIG. 8 illustrates the deployment sequence for injecting objects 12 into successive flight paths of decreasing attitude. This deployment sequence is the same as that of FIG. 7 except that the attitude of the spacecraft on the local range insensitive axis is inverted end for end, and the craft is propelled downwardly along the axis from one flight path to the next.

In each deployment sequence, the objects 12 are preferably deployed from the platforms 18 alternatively so as to maintain the center of gravity of the craft close to the intersection of the spacecraft axes $a$, $b$, and $c$. Any slight deviation between the intersection and the center of gravity is compensated for by operation of the main engine gimbal actuators 22 to continuously position the engine thrust chamber 20 in a manner such that the engine thrust axis passes through the center of gravity. Under these conditions, firing of the main engine 16 to propel the spacecraft from one flight path to the next and firing of the thrusters 100, 102 to deploy the objects 12 does not produce any unbalanced moment on the craft. While the above description relates only to passive deployment of the objects 12, the latter may also be actively deployed by forcibly ejecting the objects from the platforms 18 with the aid of springs or the like. Aside from this, the active deployment procedure is essentially the same as the passive procedure described.

Figure 6:
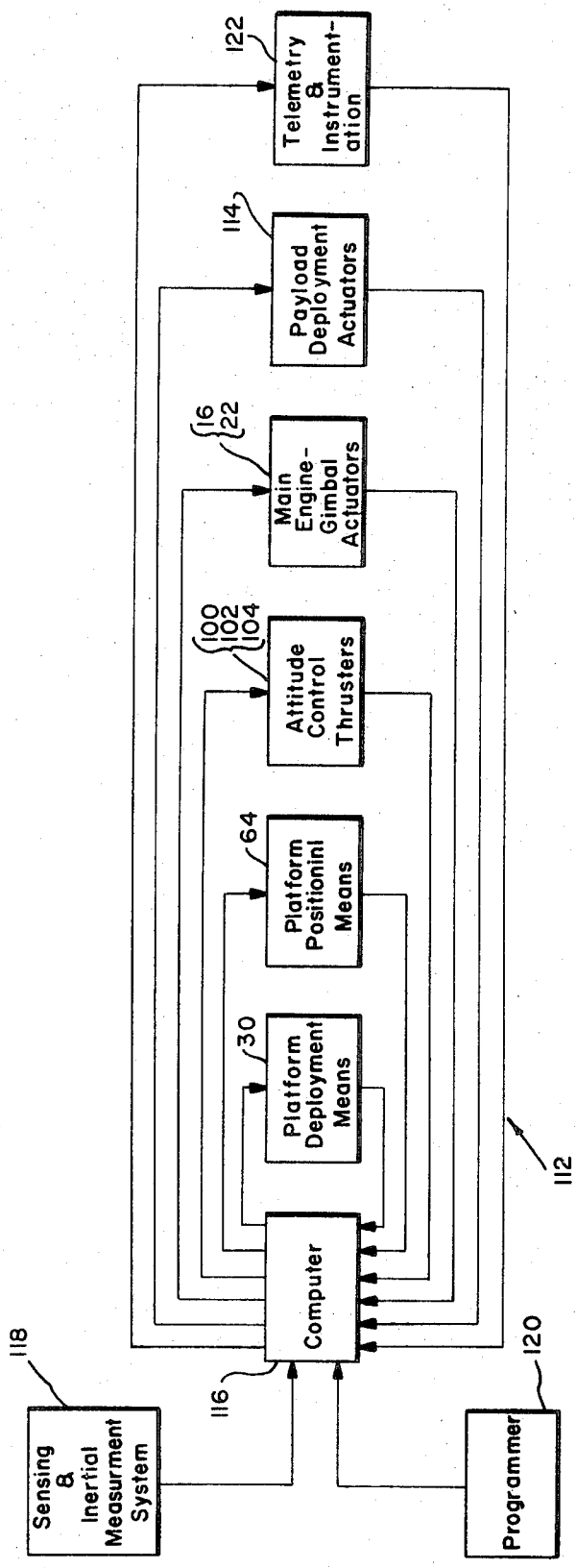
FIG. 6 is a diagrammatic illustration of the spacecraft control system.

Turning now to FIG. 6, the spacecraft control system 112 comprises a computer 116 which receives input signals from a sensor and inertial guidance system 118 and from a programmer 120. The computer feeds output signals to and receives feedback signals from the platform deployment or drive means 30, the platform positioning means 64, the attitude control thrusters 100, 102, 104, the main engine 16 and gimbal actuators 22, the payload or object deployment actuators 114, and any telemetry and instrumentation 122 on board the spacecraft.

Prior to launch, the programmer 120 is programmed with all of the data required to accomplish the selected deployment sequence, i.e., either that of FIG. 7 or that of FIG. 8. The sensing and inertial measurement system 118 and telemetry and instrumentation 122 are designed to provide all of the on board sensing and measuring functions required for the selected deployment sequence. During flight, the computer 116 receives programmed command signals from the programmer 120 and spacecraft attitude and velocity data from the sensing and inertial system 118 and feeds to the main engine 16, gimbal actuators 22 and the attitude control thrusters 100, 102, and 104 signals for effecting initial separation of the spacecraft from the booster, following stabilizing of the spacecraft at the correct velocity on the flight path P, and final rotation of the craft to its position of alignment on the local range insensitive axis I. The computer also feeds a signal to the platform deployment means 30 for extending the platform 18 to their deployment positions and a signal to the platform positioning means 32 for rotating the platforms on their axes a, c, to the proper attitude for deployment of the first object 12. It will be understood that the deployment and positioning means include means for feeding back to the computer a signal indicating full extension or deployment of the platforms and a signal representing the current platform attitude, such that the computer feeds to the positioning means an error signal for driving the platforms to their programmed attitude. Upon arrival of the platforms at their programmed deployment attitude, the computer feeds a signal to the thrusters 100, 102 for propelling the spacecraft along an axis normal to the platforms and a signal to the deployment actuator 114 for the first object to be deployed to effect deployment of the object along the flight path P. The thrusters are controlled by the computer in body; to the computer input signals from the sensing and inertial measurement system 118 and the programmer 120.

After deployment, the computer 116 feeds signals to the main engine 16 and gimbal actuators 20 for accelerating the spacecraft along the local range insensitive axis I to the next deployment position and also signals to the thrusters 100, 102 for adjusting the pitch, yaw, and roll trim of the craft as required. Here again, the computer controls the main engine and gimbal actuators in response to spacecraft attitude, velocity, and altitude signals from the sensing and inertial measurement system 118. The operation is then repeated to effect development of the second object and subsequent movement of the spacecraft to the next deployment flight path $P_3$, and so on.

In the deployment sequences of FIGS. 7 and 8, the objects 12 are deployed from the sides of the platforms 18 facing the main engine 16 by firing the platform thrusters to propel the craft in the same general direction as the main engine. According to another method of deployment, the platforms are rotated 180° on their axis a such that the objects are located on the sides of the platforms facing away from the main engine. In this case, deployment is accomplished by firing the platform thrusters to propel the craft normal to platforms but in a direction generally opposite to that of the main engine so as to effectively back the craft away from the objects.

What is claimed as new in support of Letters Patent is:

1. A spacecraft for inserting multiple objects into selected flight paths, comprising:
an elongate body including a propulsion engine for producing an axial thrust in one direction on said body;
a pair of platforms located at diametrically opposite sides of said body on a common axis bisecting said platforms and intersecting the longitudinal axis of said body;
means supporting said platforms on said body for movement along said common axis between inner retracted positions and outer extended positions and for rotation about said common axis and an axis normal to and intersecting said common axis and longitudinal axis;
platform drive means for driving said platforms along said common axis between their retracted and extended positions;
platform positioning means for rotatably positioning said platforms on said common axis and normal axis; and
means for releasably mounting said objects on said platforms.

2. A spacecraft according to claim 1 wherein:
said support means comprises an elongate support extending between said platforms along said common axis and supporting said platforms on said body for extension and retraction movement along said common axis and rotation on said common axis and said normal axis;
said drive means comprises means for extending and retracting said platforms along said common axis; and
said positioning means comprises means for rotatably positioning said support member on said common axis and said normal axis.

3. A spacecraft according to claim 1 wherein:
said support means comprises a barrel extending between said platforms on said common axis, means supporting said barrel at its center on said body for rotation of said barrel relative to said body on said common axis and normal axis, and means supporting said platforms on said barrel for movement along and rotation with said barrel;
said drive means comprises actuator means within said barrel coupled to said platforms for driving said platforms in unison along said barrel between said retracted and extended positions; and
said positioning means comprises means for rotatably positioning said barrel on said common axis and normal axis.

4. A spacecraft according to claim 3 wherein:
said positioning means comprises a first positioning device on said body for rotating said barrel on said common axis and a second positioning device on said body for rotating said barrel on said normal axis.

5. A spacecraft according to claim 1 wherein:
said platforms and engine are located at the front and rear ends, respectively, of said body;
said engine produces a forward axial thrust on said body; and
said object mounting means are located on the rear sides of said platforms.

6. A spacecraft according to claim 1 wherein:
the center of gravity of said spacecraft is located approximately at the intersection of said axes; and
said engine includes a gimballed thrust chamber, and gimbal actuators for positioning said thrust chamber to direct the thrust axis of said engine through said axis intersection.

7. A spacecraft according to claim 1 including:
attitude control jets on said platforms.

8. A spacecraft according to claim 1 wherein:
said platforms are semicircular in shape and are concentrically disposed about said body in said retracted position so as to fit within a launch vehicle shroud.

9. A spacecraft according to claim 1 wherein:
said drive means comprises a pair of drive units operatively connected to said platforms for extension and retraction of said platforms in unison by both drive units or by either drive unit alone.

10. A spacecraft according to claim 9 wherein:
said drive units comprise rotary drive motors, means connecting said motors to said platforms, respectively, for extension and retraction of said platforms by said motors, and a drive coupling between said motors for synchronizing extension and retraction movement of said platforms and permitting extension and retraction of said platforms by either motor alone.

11. A spacecraft according to claim 1 wherein:
said positioning means comprises a pair of drive units operatively connected to said platforms for rotatable positioning of said platforms on one of said common and normal axes by both drive units or either drive unit alone.

12. A spacecraft according to claim 11 wherein:
said drive units comprise rotary motors, and means connecting said motors and platforms for rotating the latter on said common axis.

13. A spacecraft according to claim 1 wherein:
said support means comprises a barrel extending between said platforms on said common axis, means supporting said barrel at its center on said body for rotation of said barrel relative to said body on said common axis and normal axis, and means supporting said platforms on said barrel for movement along and rotation with said barrel;
said drive means comprises actuator means within said barrel coupled to said platforms for driving said platforms in unison along said barrel between said retracted and extended positions;

said positioning means comprises a first positioning device drivably coupled to said barrel for rotating said barrel on said common axis, and a second positioning device connected to said bearing member for rotating said bearing member on said normal axis;

the center of gravity of said spacecraft is located approximately at the intersection of said axes;

said engine includes a gimballed thrust chamber, and gimbal actuators for positioning said thrust chamber to direct the thrust axis of said engine through said axis intersection; and attitude control jets on said platforms.

* * * * *